(12) United States Patent
Gasparini et al.

(10) Patent No.: US 7,986,071 B2
(45) Date of Patent: Jul. 26, 2011

(54) ARRANGEMENT FOR CLOSURE OF SLOTS

(75) Inventors: Rico Gasparini, Ennetbaden (CH); Armin Piur, Spreitenbach (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 12/619,836

(22) Filed: Nov. 17, 2009

(65) Prior Publication Data

US 2010/0123365 A1    May 20, 2010

(30) Foreign Application Priority Data

Nov. 18, 2008 (EP) .................................. 08169336

(51) Int. Cl.
*H02K 3/48* (2006.01)
*H02K 1/00* (2006.01)
*H02K 3/20* (2006.01)
*H02K 3/34* (2006.01)
*H02K 1/06* (2006.01)

(52) U.S. Cl. ........ 310/214; 310/194; 310/213; 310/215; 310/216.083

(58) Field of Classification Search .................. 310/183, 310/213–215, 194, 216.083
See application file for complete search history.

(56) References Cited

U.S. PATENT DOCUMENTS

| | | | |
|---|---|---|---|
| 3,243,622 A | 3/1966 | Whittlesey | |
| 3,594,597 A * | 7/1971 | Kildishev et al. | 310/214 |
| 3,665,576 A | 5/1972 | Nordmann et al. | |
| 3,976,901 A * | 8/1976 | Liptak et al. | 310/214 |
| 5,598,049 A | 1/1997 | Meier | |

FOREIGN PATENT DOCUMENTS

| | | |
|---|---|---|
| CH | 489 131 A | 5/1970 |
| CH | 525 581 | 8/1972 |
| CH | 662 911 A5 | 10/1987 |
| DE | 1 463 872 A1 | 4/1969 |
| DE | 2 165 727 | 7/1973 |
| EP | 0 379 012 A2 | 7/1990 |
| EP | 0 601 827 A1 | 6/1994 |
| EP | 0 639 882 A1 | 2/1995 |
| JP | 60-091835 A | 5/1985 |
| WO | WO 2008/141467 A1 | 11/2008 |

OTHER PUBLICATIONS

European Search Report dated Aug. 24, 2009 (with English language translation of category of cited documents).
European Search Report dated Sep. 16, 2009 (with English language translation of category of cited documents).

* cited by examiner

*Primary Examiner* — Quyen Leung
*Assistant Examiner* — Jose A Gonzalez Quinones
(74) *Attorney, Agent, or Firm* — Buchanan Ingersoll & Rooney PC

(57) ABSTRACT

An exemplary slot closure arrangement has a sliding block and a pressure piece. At least one spring element is arranged in between them and can be prestressed by at least one attachment, which interacts with the sliding block and the pressure piece, thus creating a prefabricated assembly. Once the slot closure arrangement has been positioned in a slot, the attachment can be mechanically moved from a first position to a second position, which can be monitored, after positioning of the slot closure arrangement, for activation of the spring forces of the at least one spring element.

10 Claims, 2 Drawing Sheets

ARRANGEMENT FOR CLOSURE OF SLOTS

RELATED APPLICATION

This application claims priority under 35 U.S.C. §119 to European Patent Application No. 08169336.8 filed in Europe on Nov. 18, 2008, the entire content of which is hereby incorporated by reference in its entirety.

FIELD

The present disclosure relates to a method for fixing of conductors or winding bars in slots in electrical machines or in generators, and to an apparatus or arrangement which is suitable for this purpose.

BACKGROUND INFORMATION

Forces in alternating directions act on the conductor bars and coils (referred to for simplicity in the following text as windings, which are arranged in the slots in electrical machines) because of the interaction of the electric current flowing through the windings, and the magnetic field in the air gap. The windings should be held reliably in the slot even in the event of vibration and settling of the winding. It is therefore desirable for these windings to be held essentially without any play in the slots.

Various slot closure arrangements are known. By way of example, DE-A-2165727 proposes that a wave spring washer, which is in the form of a strip, be arranged between the sliding block and a pressure piece which protects the winding and is in the form of a strip. According to DE-A-2165727, the wave spring washer is essentially pressed flat for insertion, although the document does not mention the means by which this should be done.

EP-A-0601827 adopts a similar approach, and proposes that a wave spring washer in the form of a strip be arranged between the sliding block and a pressure piece which protects the winding and is in the form of a strip. In this case, the force used for attachment originates from the prestressing of the wave spring washer. In order to insert the slot closure arrangement into the slot, the wave spring washer is attached to the pressure piece in the prestressed state by a thermal adhesive (curing, fusing, activatable). After insertion, the adhesive joint is destroyed by heating, with the aim of recreating the spring effect.

Fundamentally CH-A-662911 proposes a similar design to the slot closure arrangement disclosed in DE-A-2165727. In a first embodiment, the wave spring washer is prestressed by adhesive bonding of the wave spring washer to the pressure piece and to the sliding block. In one alternative embodiment, the prestressing of the wave spring washer is produced via a screw connection which can be activated thermally and is subjected to a heat treatment after the positioning of the slot closure arrangement, with the aim of cancelling out the prestressing effect of the screw connection.

CH-A-525 581 proposes that the sliding block and the pressure piece each be designed to be conical in the longitudinal direction of the slot, thus creating a double inclined-wedge arrangement. The sliding block and the pressure piece are pressed against one another during assembly and/or subsequent stressing in the longitudinal direction of the slot.

EP-A-0639882, discloses a further option which proposes that the sliding block be designed in the form of laminates in the direction of the slot depth such that it acts as a spring element. In a similar manner to that in the case of CH-A-525 581, the sliding block and the pressure piece are once again in the form of a double inclined-wedge arrangement in the longitudinal direction of the slot.

A further solution approach is disclosed in the ABB international patent application published as WO 2008/141467, filed on May 18, 2007, and entitled "Method for securing winding bars in grooves of electric motors or generators." The groove, or slot, closure arrangement has a spring element which is arranged between a pressure piece and a sliding block. During insertion of the slot closure arrangement into a slot, two leaf springs of the spring element, which are bent in the slot lateral direction, are adhesively bonded together using an adhesive which can be activated thermally. After the positioning of the slot closure arrangement in the slot, the adhesive joint is subjected to a heat source, to shock waves, to electromagnetic waves or to a chemical reaction, such that the adhesive joint is at least broken open, and the spring force of the spring element is recreated.

All of these slot closure arrangements have the common feature that the available spring movement distances are relatively short. These arrangements can involve complex production and complex insertion of the slot closure arrangement into the slot, and possibly undesirable adhesive residues. Practical use in the case of adhesive joints which can be activated thermally has shown that even similar adhesive joints which can be activated thermally often break open only at different temperatures and after different times of action. Because of the unpredictability of the slot closure arrangement in the assembled state, there can be a certain amount of uncertainty as to whether and to what extent the adhesive joint has actually broken open. The use of thermo-active screws or screws which can be activated thermally, can lose their strength after heating. In addition to the latent uncertainty relating to the quality of the bracing, broken-off screw residues can remain uncontrollably in the electrical machine.

SUMMARY

A slot closure arrangement is disclosed, comprising: a sliding block which extends in a direction of a longitudinal axis; a pressure piece which extends in the direction of the longitudinal axis; at least one spring element which extends in the direction of the longitudinal axis, wherein the spring element with the pressure piece forms a bending-beam arrangement in a direction of a lateral axis which extends transversely with respect to the longitudinal axis, such that the spring element can be bent by the pressure piece in a direction of a vertical axis which is arranged transversely with respect to the longitudinal axis and with respect to the lateral axis; and an attachment means for prestressing the spring element before insertion of the slot closure arrangement into a slot in an electrical machine, wherein the at least one spring element includes multiple electrically insulating fibers which are aligned unidirectionally in the direction of the lateral axis and are connected to one another by a resin, and the attachment means is configured for mechanical movement from a first position to a second position, which can be monitored after positioning of the slot closure arrangement in the slot, such that prestressing of the spring element can be released.

BRIEF DESCRIPTION OF THE DRAWING

Exemplary embodiments of the disclosure are illustrated schematically in the drawings, in which.

DETAILED DESCRIPTION

Figure 1:
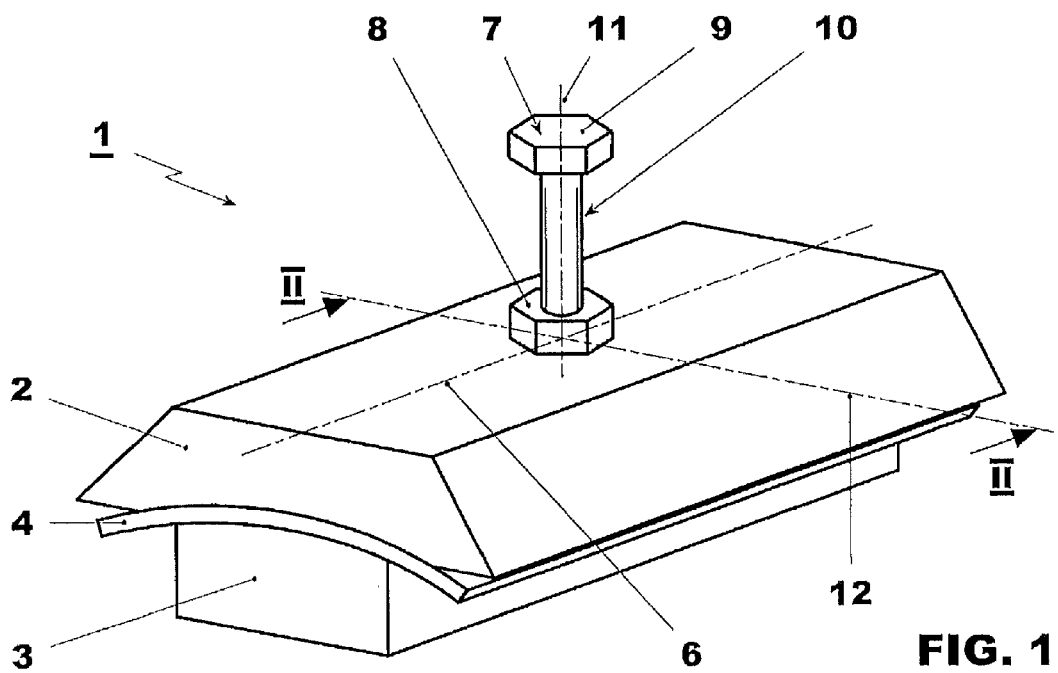
FIG. 1 shows a three-dimensional illustration of a first exemplary embodiment of a slot closure arrangement.

An exemplary slot closure arrangement according to the disclosure includes a sliding block and a pressure piece which faces a winding in the fitted state. At least one spring element is arranged between the sliding block and the pressure piece. The at least one spring element can be prestressed by at least one attachment means, which can interact with the sliding block and the pressure piece. A slot closure arrangement such as this can be prefabricated or assembled in advance as a set that is ready for installation, which can be inserted directly into a slot in the direction of a longitudinal axis. In the installed state, the longitudinal axis runs in the direction of the slot.

The slot can be a stator slot in an electrical machine. In consequence, a set-like configuration of an exemplary slot closure arrangement according to the disclosure allows the initial assembly process to be carried out more economically than in the case of known slot closure arrangements.

Once the slot closure arrangement has been positioned in the slot, the attachment means can be mechanically moved from a first position to a second position, which can be monitored, thus activating the usable spring forces of the at least one spring element. This process need not involve any additional energy to be supplied, for example in the form of heat, but can be carried out at room temperature. Activation means can release the prestressing of the spring element, but without the spring element subsequently having all the stress removed from it.

Without any other definition, the term "the attachment means", which is used in the following description and in the patent claims, for the purposes of the present disclosure encompasses, for example, without limitation, a single spring element, and a multipart spring element such as two or more spring elements which are assembled to form a spring pack.

The second position, which can be monitored, can allow a desired certainty that the assembled slot closure arrangement will firmly hold the winding section associated with it correctly in the slot, in a predefined manner. An improvement in the slot closure quality can make it possible to achieve an improvement in the reliability and susceptibility to faults, in comparison to known slot closure arrangements.

The second position can be monitored by a multiplicity of embodiment variants.

The movement of the attachment means from the first to the second position can vary depending on the chosen attachment means. This will be described in even more detail in the following description. When the attachment means is removed from the slot closure arrangement on reaching the second position, this can allow visual inspection of the slot closure quality in a particularly simple and economic manner. Exemplary embodiments can provide a capability to carry out a visual inspection quickly and reliably, without any further aids. Removable attachment means can allow economic reuse thereof for further slot closure arrangements. In a further embodiment of the slot closure arrangement, the attachment means, for example in the form of a screw, remains in the second position on the slot closure arrangement. A marking, which can be seen visually, on the screw and if desired on the sliding block can make it easier to clearly identify the desired second position, for example by means of a predefinable marking position, for example in the form of arrow heads pointing toward one another. Alternatively or additionally, the reaching of the second position in a manner which can be monitored can be achieved by identification means, for example in the form of embossing between the screw element and the sliding block surface.

When the attachment means is removed from the electrical machine after the slot closure arrangement has been fitted, the risk of attachment means or fragments thereof, remaining in an uncontrolled manner in the electrical machine, can be further reduced in comparison to known slot closure arrangements.

The attachment means can be produced from a non-metallic material, for example plastic, in order not only to reduce the risk of faults during its initial assembly from the start, but also to reduce faults during maintenance, for example by an attachment means inadvertently falling out.

An arrangement of the attachment means at the end, seen in the direction of the longitudinal axis of the slot closure arrangement, allows the spring element to be designed without any apertures in desired areas, such as in the highly loaded, approximately laterally central area in the case of the vertical axis. If the length of the slot closure arrangement according to the disclosure is relatively short along the longitudinal axis, then a desired prestressing force can be applied, for example, by a single attachment means. If a single attachment means is sufficient for prestressing the spring element or elements, it is also possible, depending on the embodiment, to arrange the attachment means approximately longitudinal centrally, seen in the direction of the longitudinal axis.

However, if the length of the slot closure arrangement according to the disclosure is greater, then, for example, it is possible to use an embodiment with a two-part attachment means arranged on each end face. If orientation positioning of the spring element relative to the pressure piece and/or relative to the sliding block is desired before the slot closure arrangement is fitted in the slot, then this can be achieved by suitable guide means. These guide means can be integrated in the pressure piece, the sliding block and/or the spring element, so that no additional components are required. In one embodiment of the slot closure arrangement, the spring element in each case has an indentation, for example, at the end, that is to say seen in the direction of the longitudinal axis. In this case, the shape of the inside of this indentation is matched to the outside of an attachment means, which is arranged on the slot closure arrangement at the end, such that the spring element is guided by its shape.

If the length of the slot closure arrangement is even greater, and even greater prestressing forces are in consequence desired, which can no longer be absorbed by two attachment means, then additional attachment means can be provided between them, for example a third attachment means arranged between them. In the latter case, depending on the embodiment, at least one aperture may be desired however, in the spring element, if the spring element has a rectangular cross section seen in the direction of the vertical axis.

Depending on the embodiment, the slot closure arrangement according to the disclosure can include at least one attachment means in the form of a screw which, for example, is screwed into an internal thread in the pressure piece during the initial assembly of the slot closure arrangement to form a set. In this embodiment, the screw head or a nut that has been screw on in advance can be used as an opposing holder for application of the prestressing force of the spring element in the direction of the vertical axis. If, instead of being formed by a screw, the attachment means is formed by a bayonet fitting with studs which engage in the correspondingly shaped pressure piece, this makes it possible to carry out the initial assembly of the slot closure arrangement particularly quickly, and to remove the attachment means from the slot closure arrangement particularly quickly.

In a further exemplary embodiment of the slot closure arrangement according to the disclosure, a connection can be made between the sliding block and the pressure piece via a form of inflatable bellows, instead of via a screw, which inflatable bellows creates a force-fitting connection by virtue of its lateral expansion, thus likewise making it possible to prestress the spring element.

Instead of the inflatable bellows, it is possible to use an attachment means like an expanding mandrel, by means of which the pressure piece and the sliding block can likewise be held laterally, in order to achieve the desired prestressing of the spring element.

A further exemplary embodiment of an attachment means has a C-shaped cross section, seen in the direction of the lateral axis, with in each case one limb being associated with the pressure piece and the sliding block, and/or engaging therein.

Furthermore, alternative attachment means can be used which, for example, are designed such that they can be partially torn off or broken off. By way of example, attachment means are mentioned as representatives of such attachment concepts, of which a portion remains on the slot closure arrangement after the prestressing has been released once the slot closure arrangement has been positioned in the slot. For example, the embodiment with a clip-like attachment means with a C-shaped cross section seen in the direction of the lateral axis has a weak point which allows a section of the attachment means (which by way of example is formed from plastic) on the sliding block side to be broken off or torn off in a defined manner. Similar activation of the spring forces can also be achieved, for example, by an attachment means which is like a rivet and whose closure head on the sliding block side can be disconnected.

In order to restrict damage resulting from attachment means or parts thereof falling into the electrical machine while the slot closure arrangement is being fitted, the attachment means can be produced from electrically insulating materials.

If the spring movement of the spring element of the slot closure arrangement according to exemplary embodiments of the disclosure is not sufficient and/or in order to make it possible to comply with customer requirements and/or further fitting requirements, for example during maintenance, the pressure piece, the sliding block and the spring element can be alternatively or in addition to the embodiments described above designed such that they form at least one wedge/opposing-wedge combination in the direction of the longitudinal axis. By way of example, a wedge/opposing-wedge combination such as this can be produced by the following constellations:

a) pressure piece and sliding block
b) pressure piece and spring element
c) sliding block and spring element
d) pressure piece, spring element and sliding block.

Depending on the specific application, variants are possible with intermediate pieces of uniform thickness or likewise a wedge-shaped cross section without departing from the actual ideas on which the present disclosure is based.

In order to achieve a defined spring stress and spring force, the sliding block can be designed to be inflexible such that it is not deformed, or is at most insignificantly deformed, during prestressing and in particular in the fitted state in the slot.

In one exemplary embodiment of the slot closure arrangement, the spring element can have, for example, a constant spring thickness, while the sliding block and the pressure piece each can have wedge surfaces with complementary shapes. In order to prestress the flat spring element, which is essentially (e.g., within ±10% tolerance or greater or lesser) planar in the unstressed state, a branding distribution is created over the width of the spring element along the lateral axis, in the direction of the vertical axis. This can be done on the basis of the known bending-beam principle, with the contact points and the force introduction point being flat, in order to avoid local damage to the spring element, and with the bending beam being produced in the direction of the lateral axis. The linear contact points can be located on a convex-curved wedge surface in the direction of the longitudinal axis, while the linear pressure point is located, for example, between the linear contact points on a concave-curved wedge surface. The curvatures can assist a centering effect of the pressure piece. For operation, it is not critical whether the concave wedge surface is associated with the pressure piece or with the sliding block. Good bracing qualities can be achieved by wedge surfaces which have an inclination angle of a few degrees, for example on the order of about one degree (or more or less).

Depending on the embodiment of the slot closure arrangement, the spring element can have a linearly increasing cross section in the longitudinal direction. This embodiment of the spring element in the form of a wedge results in different spring characteristic values over the spring length, although these can be negligible on the operation when the inclination angles are small, such as in the region of a few degrees.

When a plurality of spring elements are stacked to form a spring pack, the wedge/opposing-wedge combination can also be formed, for example, by two spring elements, while the sliding block and the pressure piece do not have wedge-shaped cross sections in the longitudinal direction.

Experiments have shown that the at least one spring element of a slot closure arrangement can have good spring characteristics when it has a multiplicity of electrically insulating fibers which are aligned unidirectionally in the direction of the lateral axis and are connected to one another by a heat-resistant resin. This results in a spring element by means of which spring forces of the desired strength and acting along the lateral axis in the direction of the vertical axis can be created. The lateral axis and the vertical axis can run on an imaginary plane which reflects a cross section of the slot and of the slot closure arrangement. A maximum spring movement accordingly can occur approximately laterally centrally over a line in the direction of the vertical axis.

Depending on the specific application, the spring element, which is in the form of a strip, can be easily configurable with regard to the desired spring movement, the spring forces and the installation situation. The capability to produce relatively long spring movements of the spring element can make it possible to compensate better for settling in the winding structure. In consequence, the maintenance intervals can be increased and the availability of the electrical machine can be improved overall. The more reliable attachment of the windings as a result of the low-fatigue spring element can, for example, contribute significantly to the life of the slot closure in the slot, and thus makes a considerable contribution to the operational reliability and to the reduction in potential damage situations.

For operation of a slot closure arrangement according to exemplary embodiments of the disclosure, the fibers should be electrically insulating. At this point, by way of example, glass fibers and/or para-amide fibers such as Kevlar may be mentioned as representatives of a multiplicity of materials which are suitable for this purpose.

Depending on the embodiment, the at least one spring element can be like a leaf spring. Depending on the specific application, a plurality of spring elements can be stacked to form a spring pack. In an exemplary embodiment, the spring element can be cuboid and is essentially flat (e.g., ±10% tolerance or lesser or greater), with the spring thickness in the direction of the vertical axis being considerably less than its width in the direction of the lateral axis. The fact that the spring element can be essentially flat in its unloaded state, that is to say in the unprestressed state, allows use for different slot widths without any need for complex modifications to the pressure piece and/or to the sliding block. Furthermore, a form such as this can assist economic production, in that a plurality of spring elements which are like strips can be cut out of a semi-finished product plate. If the fiber composite is composed of fibers with abrasion-free or low-abrasion covering layers in the direction of the vertical axis, this additionally can simplify subsequent wedging.

Instead of the slot closure arrangements as described above, it is also possible to use slot closure arrangements in which the pressure piece and the at least one spring element are combined. This integral character can lead to advantages, such as during initial assembly.

For the sake of completeness, reference is made to the use of the at least one spring element according to the previous description in a slot closure arrangement according to the previous description. Features and advantages similar to those of the exemplary slot closure arrangement and of the spring element disclosed herein can be achieved.

It should also be mentioned that a person skilled in the art can combine two or more of the features mentioned in this description to, for example, create a combination of the effects associated therewith.

Features and advantages regarding use of the slot closure arrangement according to the disclosure are similar to those of the slot closure method described herein.

An exemplary slot closure method for fixing of a winding in a slot in a stator of an electrical machine can include the following procedure:
  the winding is inserted into the slot until it rests on the slot base, seen in the direction of the vertical axis;
  a slot closure arrangement is produced, which comprises at least one spring element which is arranged between a sliding block and a pressure piece and is brought to a state in which it can be activated (for example, prestressed) by at least one attachment means which interacts with the sliding block and the pressure piece;
  this slot closure arrangement can then be inserted into the slot from one end face in the direction of its longitudinal axis;
  the slot closure arrangement can then be positioned relative to the slot in the direction of the longitudinal axis;
  the correct spring forces of the at least one spring element can then be activated mechanically.

In the case of a generator with a length, for example, of about six meters (for example, with currently about two thousand slot closure arrangements), considerable time savings and therefore financial advantages can be achieved even in the initial assembly stage, as a result of the simplified insertion of the slot closure arrangements, by means of the slot closure arrangement being configured like a set with the capability to assemble it in advance outside the actual slot. Mechanically overcoming the prestressing can result in the definitive stress state in the slot closure arrangement being achieved immediately in the slot. A further exemplary advantage is that the stress state of the slot closure arrangement in the slot can immediately be seen visually and without the assistance of any aids, thus making a considerable contribution to quality assurance.

Depending on the specific application for the fitted slot closure arrangement, the attachment means of the slot closure arrangement can be removed after activation of the correct spring forces. In this case, the attachment means can be entirely or partially removed from the slot closure arrangement. For example, if the attachment means is removed completely, this can considerably reduce the risk of damage to the electrical machine as a result of attachment means or fragments thereof remaining in an uncontrolled undesirable manner in the electrical machine. Instead of removal, embodiments are feasible in which an indication is provided that the second position of the attachment means has been reached. In this case, the indication can be provided visually, without any further aids.

A first exemplary embodiment, illustrated in FIG. 1, of a slot closure arrangement 1 according to the disclosure has a spring element 4, which is like a leaf spring and is arranged between a sliding block 2 and a pressure piece 3, illustrated in the prestressed state. These three elements 2, 3, 4 are held in a predefined first position by an attachment element 5 in this illustration, and define a longitudinal axis 6. The attachment means 5 include a screw 7 and a nut 8, which is screwed onto a threaded section 10 of the screw 7 in the direction of a screw head 9. The sliding block 2 and pressure piece 3 can be, for example, manufactured from a laminated material with glass fiber mats, mineral fillers and epoxy resin as a binding agent. For safety reasons, both the screw 7 and the nut 8 can likewise be manufactured from this material. Other materials are feasible, of course, provided that they meet requirements placed on them by a given specific application. With regard to the design and the materials of the spring element, reference is made to the description relating to FIG. 4.

Figure 2:
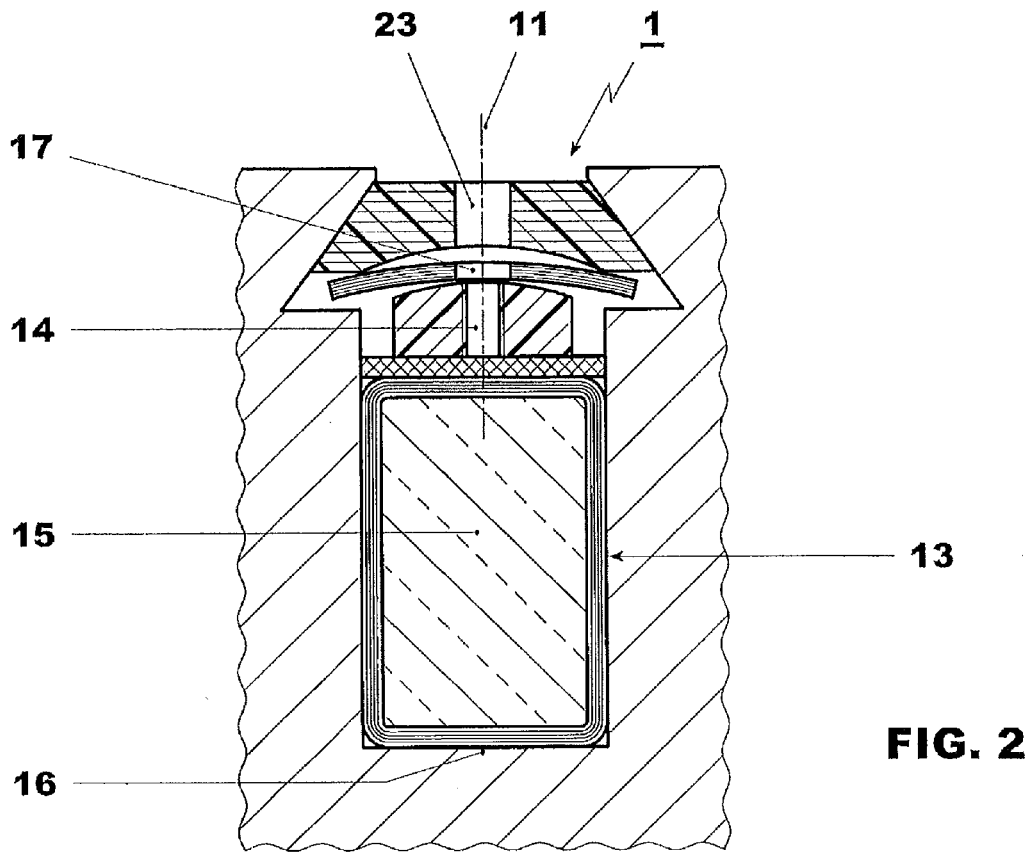
FIG. 2 shows a section through the exemplary slot closure arrangement shown in FIG. 1, along a plane symbolized by FIG. 3 shows a three-dimensional illustration of a second exemplary embodiment of a slot closure arrangement with two attachments of different design.
Figure 5:
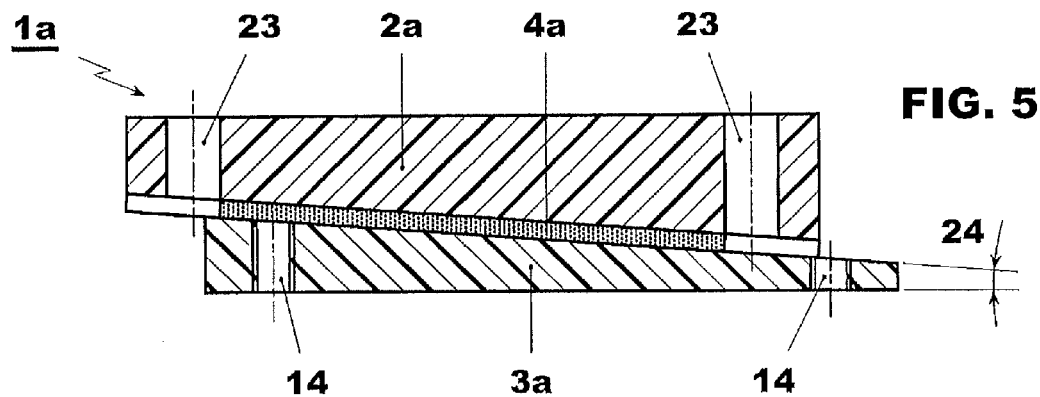
FIG. 5 shows a section through the exemplary slot closure arrangement shown in FIG. 3, along a plane symbolized by V-V.

Together with FIG. 2 and by analogy with the further embodiment showing the slot closure arrangement shown in FIG. 5, FIG. 1 is based on the pressure piece 3 and the sliding block 2 being in the form of a wedge/opposing-wedge combination with an inclination angle 24 of about one degree, wherein the pressure piece 3 additionally has convex curvature in the direction of a vertical axis on its upper face, in order to allow a linear contact with the lower face of the concave-curved sliding block 2.

A section view along a section plane symbolized by II-II in FIG. 1, as illustrated in FIG. 2, with this section plane being defined by a vertical axis 11 and a lateral axis 12, shows the slot closure arrangement 1 in a second state. The second state is reached when the slot closure arrangement 1, which is in the form of a set or preassembled unit, is, for example, inserted into a stator slot 13 in a generator, and is positioned in the direction of the longitudinal axis 6 or of the slot, once the attachment means has been moved from the first position to a second position, which can be monitored. In this embodiment, the attachment means 5 was screwed out of the slot closure arrangement 1 after reaching or in order to reach the second position. When the threaded section 10 of the screw 7 leaves a corresponding internally threaded section 14 in the pressure piece 3, predefined spring forces of the at least one spring element 4 will have been activated. Since the screw 5 is missing, successful activation of the spring element 4 can be reliably inspected by the naked eye.

The spring forces can ensure that an insulated winding 15 is reliably held firmly in the slot 13, by the winding 15 being pressed against a slot base 16. The spring forces can be designed to correspond to the installation and operating requirements of the specific slot closure arrangement.

As can also be seen from FIG. 2, the spring element 4 has an aperture 17 in the area of the vertical axis 11, through which the attachment means had been guided, in order to prestress the spring element 4. The geometry of this aperture 17 can be chosen such that the cracks and/or weakening of the spring element 4 can be prevented, as far as possible, or are at least kept to a minimum.

Figure 3:
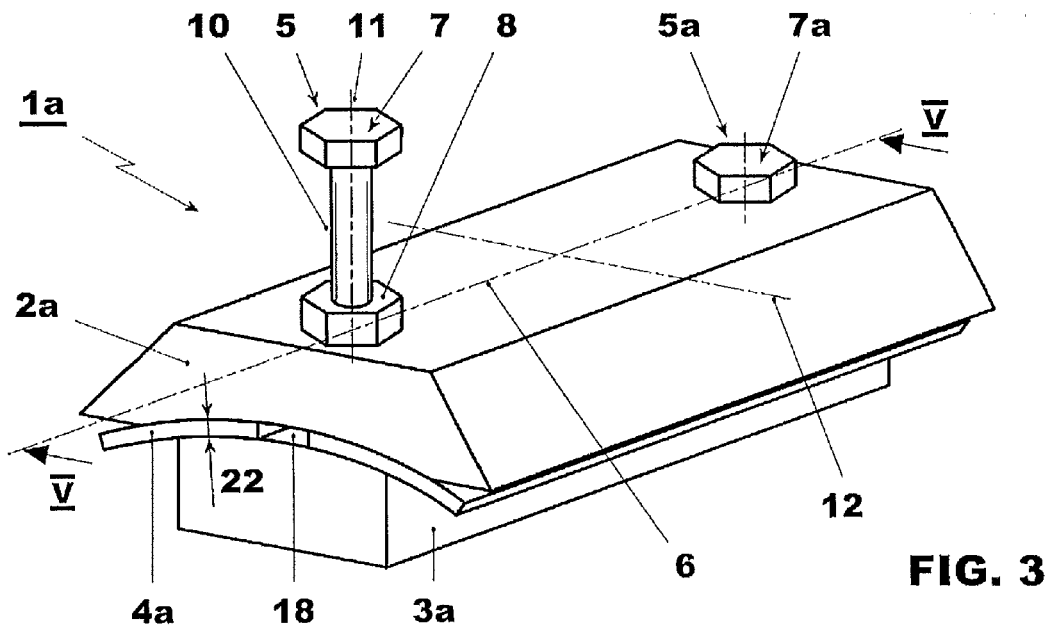

FIG. 3 shows a second exemplary embodiment 1a of the slot closure arrangement according to the disclosure, with a prestressed spring element 4a. Since the fundamental design is similar to the first exemplary embodiment illustrated in FIG. 1, identical elements have been provided with the same reference symbols, and elements with the same or a similar effect have been provided with appropriately supplemented reference symbols, for example "a".

Because of the analogous method of operation of the elements of the slot closure arrangement according to the second embodiment to that of the first embodiment, only the differences between the two embodiments 1, 1a will be described in the following text.

For example, the embodiment of the attachment means 5 to the right of the known screw/nut combination is formed simply by a screw 7a whose threaded section engages in the corresponding internally threaded section in the pressure piece, in the first position.

Figure 4:
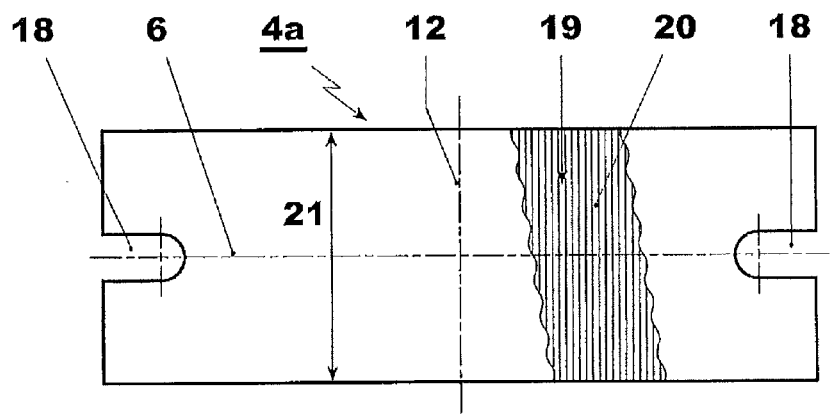
FIG. 4 shows a plan view in the direction of a vertical axis of an exemplary spring element, as illustrated in a prestressed form in FIG. 3, in an unloaded state.

The spring element 4a illustrated in FIG. 4 corresponds to the spring element used in FIG. 3, in a plan view in the direction of the vertical axis 11. For the sake of simplicity, the spring element 4a is shown in the unloaded state.

In conjunction with FIG. 3, it is evident from FIG. 4 that the spring element 4a has an indentation 18 in the direction of the longitudinal axis 6 on each of the two end faces, in order to allow the attachment elements to be passed through. The shape of the interior of this indentation 18 is in this case can be matched to an outer face of an attachment means which is arranged at the end on the slot closure arrangement, such that, by virtue of its shape, the spring element 4a is guided laterally on the screws 7, 7a, to be precise on their threaded sections, in order to make it easier to position the spring element 4a during initial assembly.

Experiments have confirmed that very good spring characteristics can be achieved with an exemplary spring element 4a designed as follows:

As can be seen in particular from the area 19 that is illustrated cut open, the electrically insulating spring element 4a has a multiplicity of electrically insulating fibers 20, which are aligned unidirectionally in the direction of the lateral axis 12 and are permanently connected to one another by means of a heat-resistant resin. This results in a spring element by means of which spring forces which act along the lateral axis 12 in the direction of the vertical axis 11 and have a predefinable strength can be activated.

The electrically insulating fibers in this embodiment of the spring element can be formed from a multiplicity of glass fibers 20, with the proportion of glass fibers in the spring element corresponding, for example, to about two thirds, as a percentage by weight, and the proportion of resin corresponding, for example, to about ⅓ as a percentage by weight.

The lateral axis 12 and the vertical axis 11 can run on an imaginary plane which reflects a cross section of the slot 13 and of the slot closure arrangement 1, 1a. A maximum spring movement accordingly ideally can occur approximately laterally centrally in the direction of the vertical axis 11.

With an exemplary slot width of about 35 mm, an exemplary spring width 21 of about 33 mm in the direction of the lateral axis 12 and an exemplary spring thickness 22 of about 1.3 mm in the direction of the vertical axis 11 resulted in an excellent spring movement of about 2.5 mm.

FIG. 5 shows an exemplary slot closure arrangement 1a from FIG. 3 along a plane, which is symbolized by V-V, in a subsequently wedged state as arises, for example, as a result of subsequent wedging for maintenance purposes. The edges which result from the curvature of the wedge surfaces are not illustrated, for clarity reasons. This view shows the internally threaded sections 14, which have been shifted with respect to one another, and through-holes 23, which were used for the attachment means to be passed through at the time of initial assembly.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 1, 1a Slot closure arrangement
2, 2a Sliding block
3, 3a Pressure piece
4, 4a Spring element
5, 5a Attachment means
6 Longitudinal axis
7, 7a Screw
8 Nut
9 Screw head
10 Threaded section
11 Vertical axis
12 Lateral axis
13 Slot
14 Internally threaded section
15 Winding
16 Slot base
17 Aperture/orifice
18 Indentation
19 Area illustrated cut open
20 Fibers
21 Spring width
22 Spring thickness
23 Through-hole
24 Inclination angle

What is claimed is:

1. A slot closure arrangement, comprising:
a sliding block which extends in a direction of a longitudinal axis;
a pressure piece which extends in the direction of the longitudinal axis;
at least one spring element which extends in the direction of the longitudinal axis, wherein the spring element with the pressure piece forms a bending-beam arrangement in a direction of a lateral axis which extends transversely with respect to the longitudinal axis, such that the spring element can be bent by the pressure piece in a direction of a vertical axis which is arranged transversely with respect to the longitudinal axis and with respect to the lateral axis; and an attachment means for prestressing the spring element before insertion of the slot closure arrangement into a slot in an electrical machine, wherein the at least one spring element includes multiple electrically insulating fibers which are aligned unidirectionally in the direction of the lateral axis and are connected to one another by a resin, and the attachment means is configured for mechanical movement from a first position to a second position, which can be monitored after positioning of the slot closure arrangement in the slot, such that prestressing of the spring element can be released.

2. The slot closure arrangement as claimed in claim 1, wherein the attachment means is configured for removal from the slot closure arrangement on reaching the second position, or for visual identification at the second position.

3. The slot closure arrangement as claimed in claim 1, wherein the attachment means is arranged at an end of the slot closure arrangement in the direction of the longitudinal axis.

4. The slot closure arrangement as claimed in claim 1, wherein the attachment means is arranged approximately longitudinally centrally on the slot closure arrangement in the direction of the longitudinal axis.

5. The slot closure arrangement as claimed in claim 1, wherein the attachment means comprises:
at least one screw associated with the pressure piece for moving the sliding block in the direction of the vertical axis.

6. The slot closure arrangement as claimed in claim 1, wherein the attachment means comprises:
at least one holding element configured as one of a bracket, a rivet, an expanding mandrel, or a bayonet fitting.

7. The slot closure arrangement as claimed in claim 1, wherein the pressure piece, the sliding block and the spring element are configured such that at least one wedge/opposing-wedge combination is formed in the direction of the longitudinal axis.

8. The slot closure arrangement as claimed in claim 1, wherein the resin is a heat-resistant resin.

9. The slot closure arrangement as claimed in claim 1, wherein the pressure piece and the at least one spring element are integrally combined.

10. The slot arrangement of claim 1, wherein the spring element is a leaf spring.

* * * * *